(12) United States Patent
Ellis et al.

(10) Patent No.: US 9,929,983 B2
(45) Date of Patent: Mar. 27, 2018

(54) AUTONOMOUS AGENT SYSTEM

(71) Applicant: International Business Machines Corporation, Armonk, NY (US)

(72) Inventors: Jason B. Ellis, New York, NY (US); Eser Kandogan, Mountain View, CA (US); Jeffrey O. Kaphart, Cortlandt Manor, NY (US); Mary A. Roth, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/953,841

(22) Filed: Nov. 30, 2015

(65) Prior Publication Data

US 2017/0155601 A1  Jun. 1, 2017

(51) Int. Cl.
*G06F 15/16* (2006.01)
*H04L 12/58* (2006.01)

(52) U.S. Cl.
CPC ............ *H04L 51/02* (2013.01); *H04L 51/14* (2013.01)

(58) Field of Classification Search
CPC .......... G06N 99/005; G06N 5/04; G06N 5/02; G06N 5/022; G06N 3/004; G06F 17/30144; G06F 11/1435; G06F 11/1451; G06F 11/1461; G06F 11/1464; G06F 11/1466; G06F 11/1471; G06F 17/30194; G06F 17/30312; G06F 17/30321; G06F 17/30424; G06F 17/30528; G06F 17/30598
See application file for complete search history.

(56) References Cited

U.S. PATENT DOCUMENTS

| 8,615,713 | B2 | 12/2013 | Sun et al. | |
|---|---|---|---|---|
| 8,868,533 | B2 | 10/2014 | Powell et al. | |
| 2003/0115291 | A1* | 6/2003 | Kendall | G06F 17/30867 709/219 |
| 2004/0117801 | A1* | 6/2004 | Eibach | G06F 9/546 719/314 |
| 2007/0016464 | A1* | 1/2007 | Yen | G06Q 10/00 705/301 |
| 2007/0124312 | A1* | 5/2007 | Simpson | G06Q 10/107 |
| 2008/0228886 | A1* | 9/2008 | Reed | G06F 9/542 709/206 |

OTHER PUBLICATIONS

A. Nguyen, et al., "An Agent•Based Approach to Dialogue Management in Personal Assistants", IUI, ACM, Jan. 10-13, 2005, p. 1-8.

(Continued)

*Primary Examiner* — Djenane Bayard
(74) *Attorney, Agent, or Firm* — Cantor Colburn LLP; Yeen Tham

(57) ABSTRACT

According to an embodiment of the present invention, a method for operating a cognitive computing system comprises starting a capture agent on a processor, subscribing the capture agent to a second agent, receiving a first message from the second agent, storing the received first message in a memory, receiving a notification of a new subscription from a third agent, and registering the capture agent to subscribe to the new subscription from the third agent.

20 Claims, 9 Drawing Sheets

(56) References Cited

OTHER PUBLICATIONS

D. Sarne, et al.,"Less Is More: Restructuring Decisions to Improve Agent Search", reserch Gate, AAMAS, May 2-6, 2011, p. 1-9.
E. S. Yu, "Evolving and Messaging Decision-Making Agents", Agents, ACM, May 28-Jun. 1, 2001, p. 1-9.
K-Jia Chen, et al.,"Giving Personal Assistant Agents a Case—Based Memory", IEEE International Conference on Cognitive Informatics, Aug. 14-16, 2008, p. 1-3.
S. E. Middleton "Interface agents: A review of the field", arXiv:cs, Mar. 9, 2002, p. 1-28.

\* cited by examiner

◢─300

CONTEXT ID: 998343
MESSAGE ID: 298343
AGENT ID: 34
PUBLISHED: 38u4938409382403
CONTENT="Watson show me companies with revenue between 15000000 dollars and 50000000 dollars pertaining to analytics"
   message: {
      content: watson show me companies with revenue between 15000000 dollars and 50000000 dollars pertaining to analytics,
      time: 1417619552813,
      username: Attila
   },
   cmd: {
      action: show,
      subject: {
         type: company,
         criteria: {
            revenue: {
               between: [ 15, 50 ]
            },
            concepts: [ analytics ]
      } }}

FIG. 3

AUTONOMOUS AGENT SYSTEM

BACKGROUND

The present invention relates to autonomous agent systems and more specifically, to a system for capturing and replaying operations of autonomous agent systems.

Symbiotic cognitive computing systems are multi-agent systems comprising human and software agents that work in partnership, resulting in a collective that performs cognitive tasks such as decision making better than humans or software agents can unaided.

Typical systems include agents that publish and subscribe to messages. The agents receive messages, process the messages, and output subsequent messages that may in turn, be received and processed by other agents.

SUMMARY

According to an embodiment of the present invention, a method for operating a cognitive computing system comprises starting a capture agent on a processor, subscribing the capture agent to a second agent, receiving a first message from the second agent, storing the received first message in a memory, receiving a notification of a new subscription from a third agent, and registering the capture agent to subscribe to the new subscription from the third agent.

According to another embodiment of the present invention, a system comprises a memory, a processor communicatively connected to the memory, the processor operative to start a capture agent on a processor, subscribe the capture agent to a second agent, receive a first message from the second agent, store the received first message in a memory, receive a notification of a new subscription from a third agent, and register the capture agent to subscribe to the new subscription from the third agent.

According to yet another embodiment of the present invention, a computer program product comprising a computer readable storage medium having program instructions embodied therewith, the program instructions executable by a processor to cause the processor to perform a method comprising starting a capture agent on a processor, subscribing the capture agent to a second agent, receiving a first message from the second agent, storing the received first message in a memory, receiving a notification of a new subscription from a third agent, and registering the capture agent to subscribe to the new subscription from the third agent.

BRIEF DESCRIPTION OF THE DRAWINGS

FIG. 3 illustrates an example of a message.

FIG. 4 illustrates a flow diagram of the initialization of a capture agent.

FIG. 5 illustrates a flow diagram an exemplary method of operation of the capture agent.

FIG. 6 illustrates a flow diagram of the exemplary operation of the capture agent.

FIG. 7 illustrates an exemplary method of operation of the replay agent.

DETAILED DESCRIPTION

Symbiotic cognitive computing systems include a number of agents that each perform particular tasks. The agents output and receive a variety of message streams. For example, when an agent A outputs (publishes) messages, an agent B may receive (subscribe) to the stream of messages published by agent A. Some of the messages published by agent A may include information, data, or instructions that may be processed by agent B, which may then output messages to agent A or other agents. Through this scheme, any number of tasks may be performed by the system.

In previous cognitive computing systems, previous tasks performed by agents were difficult to replay or re-present to a user. The ad-hoc architecture of the systems lends to this difficulty. For example, a user may have requested a variety of information about a particular company called Acme, such as, the stock price of Acme, the previous quarter revenue of Acme, and the names of subsidiaries owned by Acme. In previous systems, if the user desired to receive the same information a week later, the user would not be able to simply replay the sequence of requests for information, and the sequences of responses to those requests, by referring to the previous session. Rather, the user would need to re-request the information as if the previous session had not occurred.

Such previous systems lacked a method for capturing and replaying previous sessions in a context that was usable and useful for a user. The methods and systems described herein include embodiments that provide for capturing and replaying requests for information as well as improving a user's interaction with autonomous agents, and support for collaboration amongst users.

Figure 1:
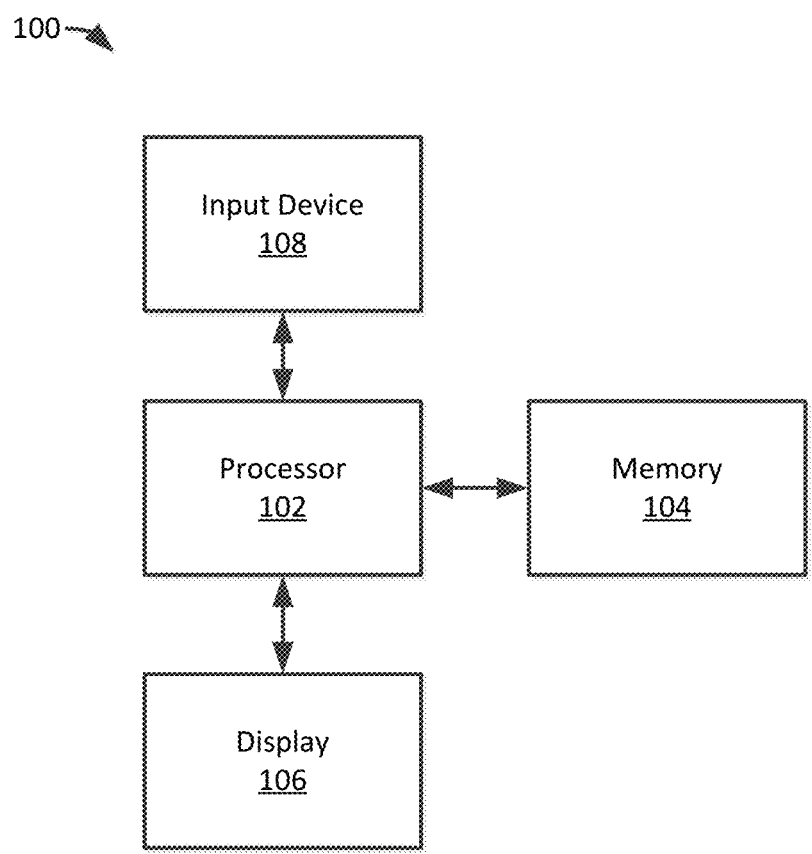
FIG. 1 illustrates a block diagram of an exemplary embodiment of a processing system.

FIG. 1 illustrates a block diagram of an exemplary embodiment of a processing system 100. The processing system 100 includes a processor 102. The processor 102 is communicatively connected to a memory 104, a display 106, and an input device 108.

Figure 2:
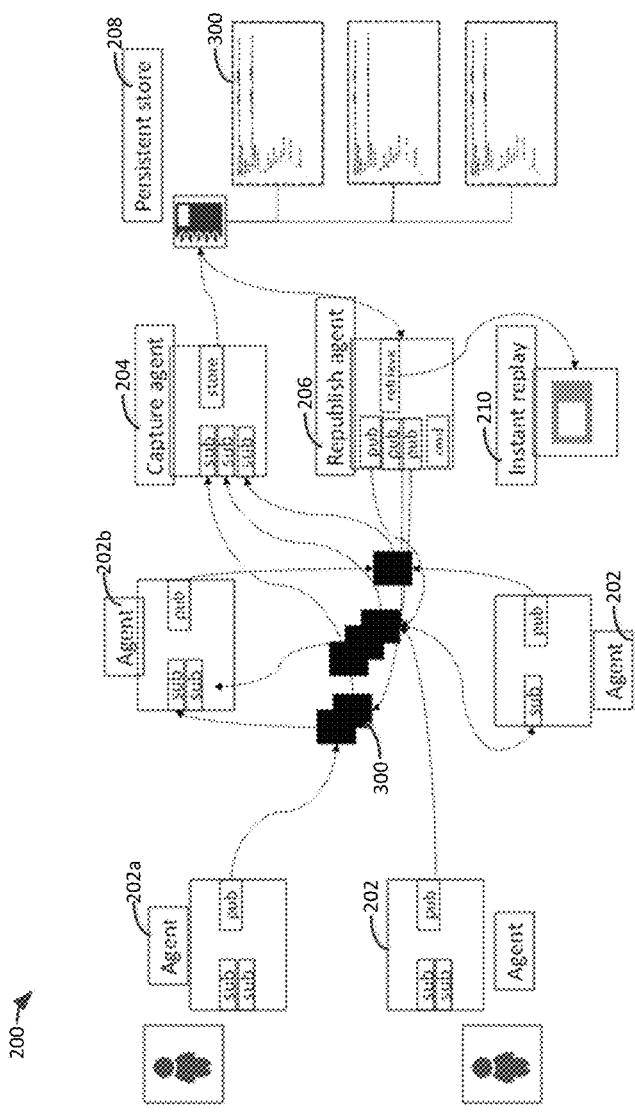
FIG. 2 illustrates a block diagram of an exemplary embodiment of a symbiotic cognitive computing system that operates on the processing system of FIG. 1.

FIG. 2 illustrates a block diagram of an exemplary embodiment of a symbiotic cognitive computing system (system) 200 that operates on the processing system 100 (of FIG. 1). The system 200 includes agents 202 that may perform any number of tasks. The agents 202 interact with each other by publishing messages and subscribing to messages published by other agents. In the illustrated exemplary embodiment, the agent 202a is operative to receive requests from a user. In response to those requests, the agent 202a performs the task for which it was designed, and produces an output that includes messages 300 that are sent (published) in a message stream. The agent 202b subscribes to one or more agents 202, processes messages 300 that are relevant to the agent 202b, responds to those messages by performing a task for which it was designed, and publishes output messages 300.

The illustrated exemplary embodiment includes a capture agent 204, a republish agent 206, persistent storage 208, and a replay module 210. The operation of the capture agent 204, the republish agent 206, persistent storage 208, and replay agent 210 will be described in further detail below.

FIG. 3 illustrates an example of a message 300. The message 300 includes a context identifier (ID) 302 that identifies messages that are logically related. The message 300 also includes a message ID 304 that uniquely identifies the message 300, and an agent ID 306 that identifies the agent that generated the message 300. The message 300 includes a time stamp 308 that notes when the message 300 was created, and content 310 that may include for example, data or instructions that may be received and processed by another agent or output to a user.

Figure 4:
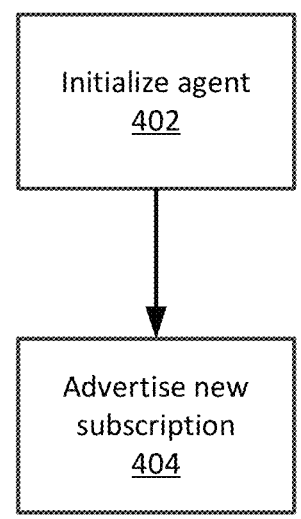
FIGS. 4-7 illustrate flow diagrams of an exemplary method of operation of the system of FIG. 2.

FIGS. 4-7 illustrate flow diagrams of an exemplary method of operation of the system 200 (of FIG. 2). Referring to FIG. 4, in block 402 the processor 100 (of FIG. 1) initializes an agent 202. When the agent 202 is initialized, the agent 202 advertises a new subscription in block 404. The initialized agent 202 may advertise the new subscription by, for example, sending a message to another agent 202 that tracks new subscriptions from the agents 202 such that agents 202 may receive a notification that a new subscription is available.

Figure 5:
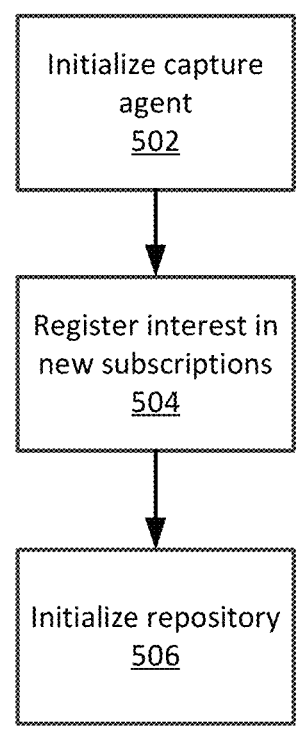

FIG. 5 illustrates an exemplary method of operation of the capture agent 204 (of FIG. 2) during initialization of the capture agent 204. In this regard, in block 502, the capture agent 204 is initialized. The capture agent registers interest in new subscriptions in block 504, and initializes the repository in block 506. The repository includes a memory organization or database that is operative to store messages 300.

Figure 6:
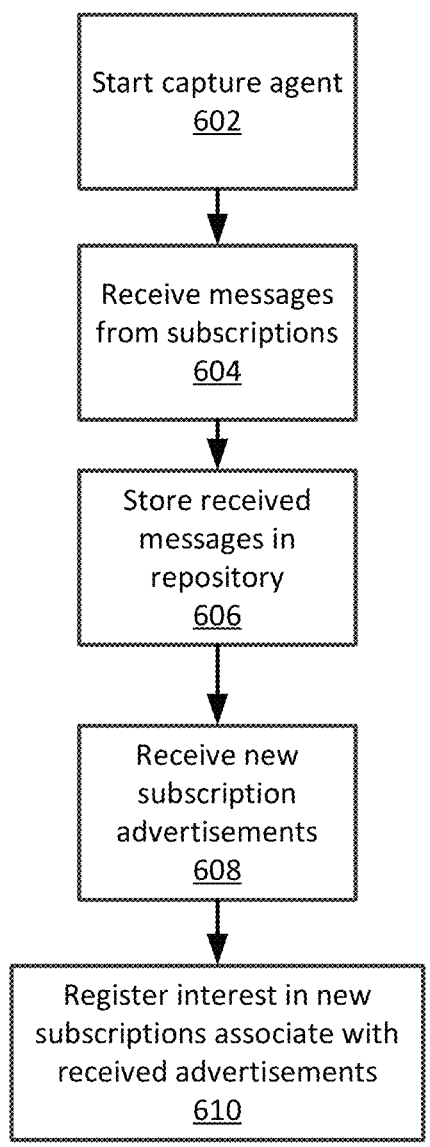

FIG. 6 illustrates a flow diagram of the exemplary operation of the capture agent 204 (of FIG. 2). Once the capture agent 204 is initialized, the capture agent 204 is operative to subscribe to a number of agents 202. In block 602 the capture agent 204 is started. The capture agent 204 receives messages 300 from agents 202 that the capture agent 204 is subscribed to in block 604. In block 606, the capture agent 204 stores received messages 300 in the repository (persistent store) 208. In block 608, the capture agent 204 receives new subscription advertisements from other agents 300. The capture agent 204 registers interest in new subscriptions associated with received advertisements in block 610.

Figure 7:
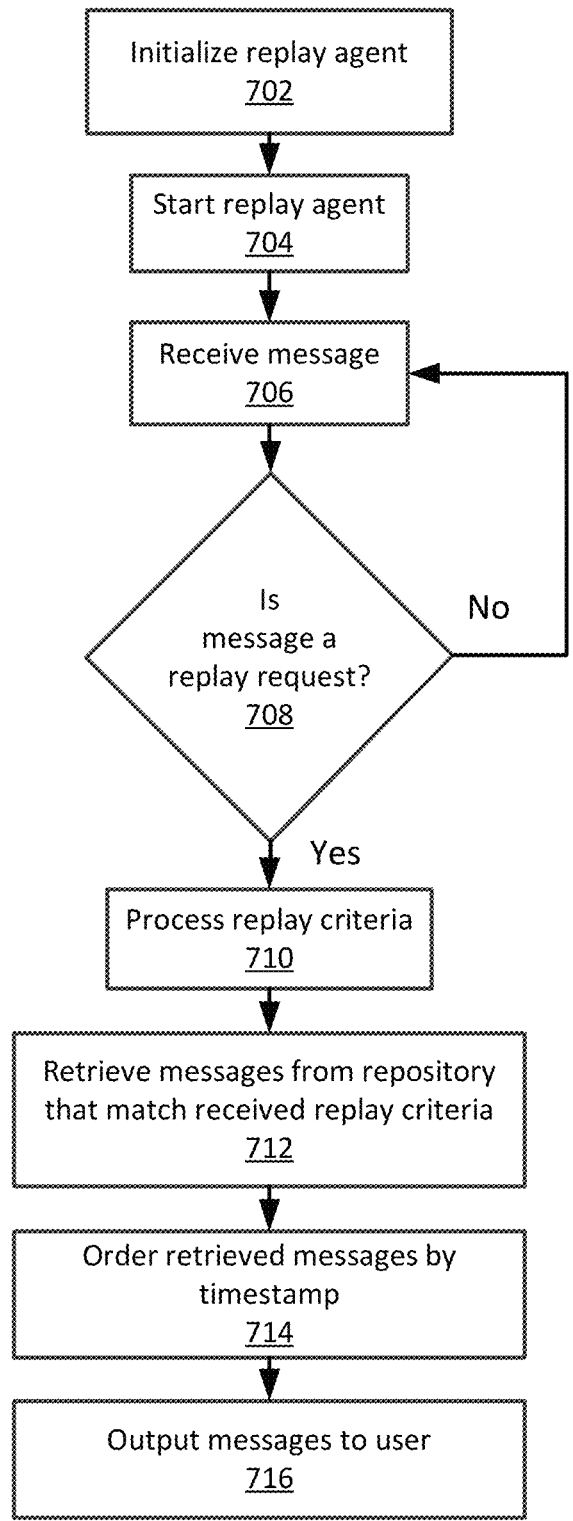

FIG. 7 illustrates an exemplary method of operation of the replay agent 210. The replay agent 210 is initialized in block 702 and started in block 704. In block 706, the replay agent 706 receives a message 300. The replay agent 210 determines whether the message is a replay request in block 708. If yes, the replay agent 210 processes the replay criteria in the message 300 in block 710. In block 712, the replay agent 210 retrieves messages 300 from the persistent store (repository) 208 that match or correspond to the received replay criteria. Examples of replay criteria are provided below. The replay agent 210 sorts the retrieved messages 300 chronologically by the timestamps 308 of the messages 300 in block 714. In block 716, the replay agent 210 outputs the received and sorted messages 300 to the user. The messages 300 may be output to the user via audio, textual or other suitable replay means.

The republish agent 206 (of FIG. 2) is operative to receive requests from agents 202 for messages 300 that are stored in the persistent store 208 and retrieve the requested messages in a similar manner as the replay agent 210 described above. However, the republish agent 206 may publish the retrieved messages 300 such that other agents 202 may subscribe to the republish agent 206 and receive the messages 300 published by the republish agent 206. The agents 202 may use the messages 300 published by the republish agent 206 for any number of tasks.

A variety of replay criteria may be used in practice to realize many different use cases. One example of replay criteria provides restrictions on which messages are to be replayed, such as only those messages pertaining to a specified application during a specified time period. A second class of criteria may specify restrictions or modifications to be applied to parts of messages. For example, the replay criteria might specify that any reference to an agent of type "company-details v1" should be replaced with "company-details v2", thereby ensuring that the replay will be performed using a newer (perhaps improved) version of the company-details agent. As a second example of restrictions or modifications to parts of messages, the replay criteria might specify that data derived by an agent and contained within its output message should be ignored, resulting in deliberate re-computation of results.

The system that performs the replay may differ from the system in which the original messages were generated. One example is one in which at least one agent in the system has been upgraded since the time when the messages were generated initially. An example is that in which data operated upon by the agents (for example a database of customer names) has changed since the time when the messages were generated initially. Under such conditions, the output generated by the system may be different from what it had been originally. Depending upon the use case scenario, such differences may or may not be deemed desirable by the user.

Regarding replaying messages, the messages may be replayed according to a variety of criteria that may or may not be specified by a user using user commands. For example, messages may be replayed with saved data, replay with new data, replay with substitution of a parameter (i.e., replace a parameter and replay with the replaced parameter), and replay to save under a different name. A user may interact with the system by, for example, giving verbal, textual or other input using a graphical user interface to control what messages are captured and what messages are replayed to the user at a later time.

If such changes are not deemed desirable, the original behavior could be replayed by ensuring that the original data generated by the agents are contained in their output messages, and the replay criteria could specify that the data not be regenerated during replay, but kept at their original values.

Another example in which the replay is performed may differ from the original system is that in which at least one output device is different from the device in the original system. In an exemplary use case, a remote participant performs a replay in a physical environment other than the one in which the original messages were generated, allowing the user to receive messages similar to the original session, but rendered in a manner more suited to the remote environment, e.g. on a mobile device as opposed to the original laptop or cognitive boardroom. Under the latter scenario, the invention is seen as a method for supporting collaboration across user space as well as across time.

The exemplary methods and systems described herein provide a symbiotic cognitive computing system that is operative to store messages from sessions that a user has interacted with in the past and store the messages with a contextual indicator of the relationship between the messages. The exemplary methods and systems are further operative to retrieve the stored messages and send the retrieved messages to agents for further processing or output to a user.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
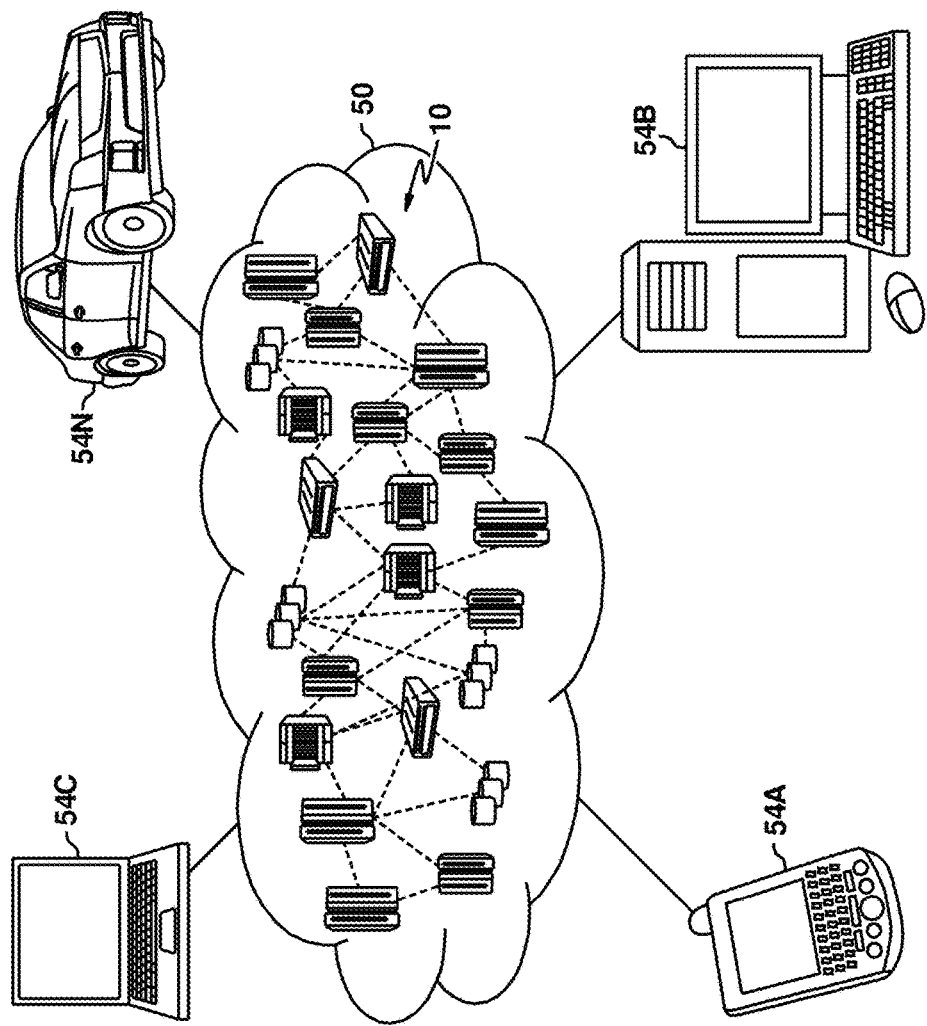
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
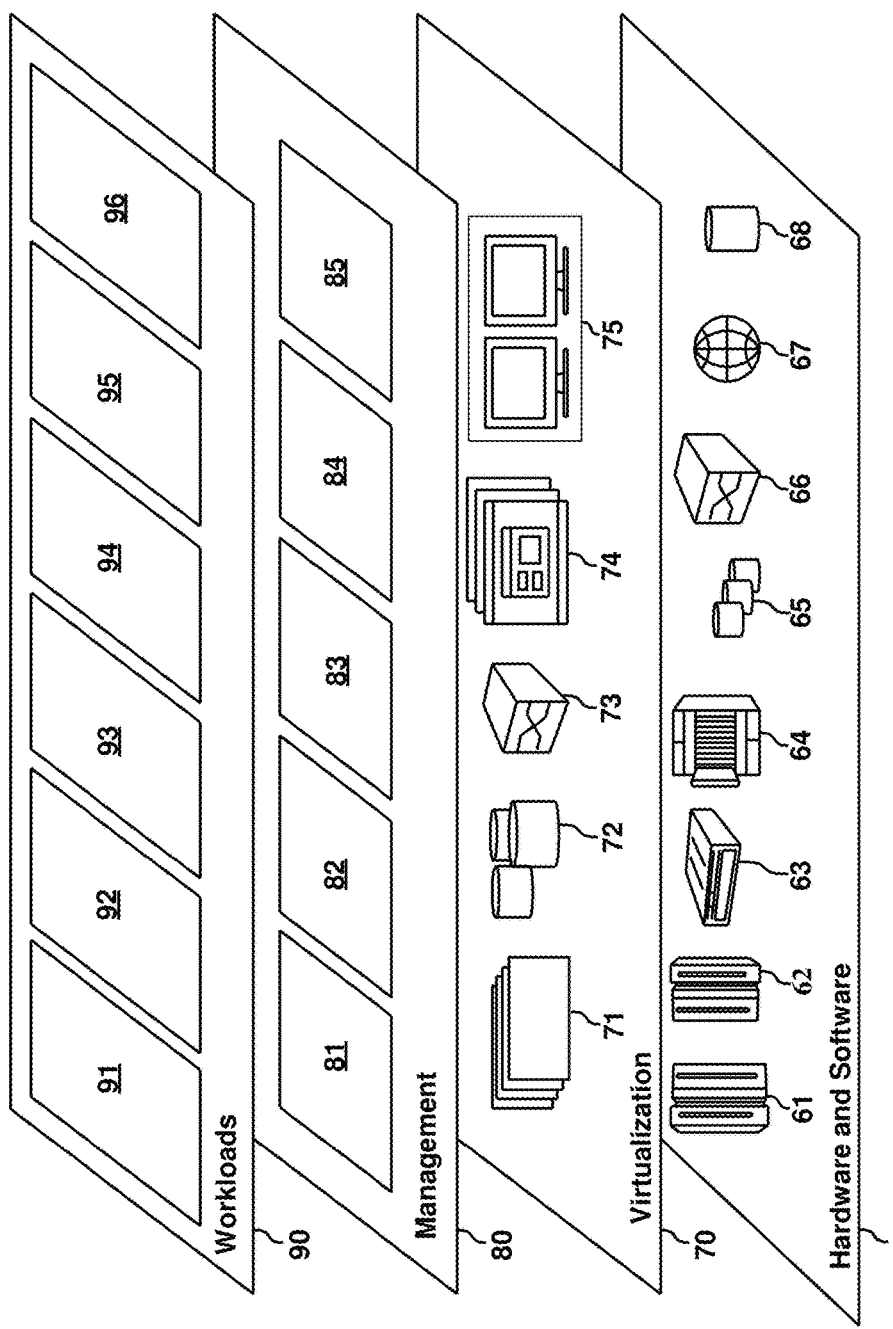
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a symbiotic cognitive computing system that is operative to store messages from sessions that a user has interacted with in the past and store the messages with a contextual indicator of the relationship between the messages. The exemplary methods and systems are further operative to retrieve the stored messages and send the retrieved messages to agents for further processing or output to a user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for operating a cognitive computing system, the method comprising:
    starting a capture agent on a processor;
    subscribing the capture agent to a second agent;
    receiving a first message from the second agent, wherein the first message is based at least in part on first data;
    storing the received first message in a memory;
    receiving a notification of a new subscription from a third agent;
    registering the capture agent to subscribe to the new subscription from the third agent;
    starting a replay agent to replay a replay message to a user responsive to receiving a replay request;
    replaying the replay message based at least in part on second data, wherein the second data differs from the first data; and
    starting a republish agent to republish a republish message to another agent responsive to receiving a republish request.

2. The method of claim 1, further comprising:
    receiving a second message at the replay agent;
    determining whether the second message includes the replay request;
    processing replay criteria in the second message responsive to determining that the second message includes the replay request;
    retrieving messages that correspond to the replay criteria from the memory; and
    outputting the retrieved messages to the user.

3. The method of claim 2, further comprising sorting the retrieved messages according to timestamps of the retrieved messages prior to outputting the retrieved messages to the user.

4. The method of claim 2, wherein the replay criteria includes a contextual identifier of the messages.

5. The method of claim 1, wherein the first message includes:
    a contextual identifier that identifies a context of the first message;
    a message identifier that uniquely identifies the first message;
    an agent identifier that identifies an agent that generate the first message; and
    a timestamp that identifies when the message was generated.

6. The method of claim 1, further comprising:
    receiving a second message at the republish agent;
    determining whether the second message includes the republish request;
    processing republish criteria in the second message responsive to determining that the second message includes the republish request;
    retrieving messages that correspond to the republish criteria from the memory; and
    outputting the retrieved messages to the other agent.

7. The method of claim 6, further comprising sorting the retrieved messages according to timestamps of the retrieved messages prior to outputting the retrieved messages to the agent.

8. A system comprising:
    a memory;
    a processor communicatively connected to the memory, the processor operative to:
        start a capture agent on a processor;
        subscribe the capture agent to a second agent;
        receive a first message from the second agent, wherein the first message is based at least in part on first data;
        store the received first message in a memory;
        receive a notification of a new subscription from a third agent;
        register the capture agent to subscribe to the new subscription from the third agent;
        start a replay agent to replay a replay message to a user responsive to receiving a replay request;
        replay the replay message based at least in part on second data, wherein the second data differs from the first data; and
        start a republish agent to republish a republish message to another agent responsive to receiving a republish request.

9. The system of claim 8, wherein the processor is further operative to:
    receive a second message at the replay agent;
    determine whether the second message includes the replay request;
    process replay criteria in the second message responsive to determining that the second message includes the replay request;

retrieve messages that correspond to the replay criteria from the memory; and output the retrieved messages to the user.

10. The system of claim 9, wherein the processor is further operative to sort the retrieved messages according to timestamps of the retrieved messages prior to outputting the retrieved messages to the user.

11. The system of claim 9, wherein the replay criteria includes a contextual identifier of the messages.

12. The system of claim 8, wherein the first message includes:

a contextual identifier that identifies a context of the first message;

a message identifier that uniquely identifies the first message;

an agent identifier that identifies an agent that generate the first message; and a timestamp that identifies when the message was generated.

13. The system of claim 8, wherein the processor is further operative to:

receive a second message at the republish agent;

determine whether the second message includes the republish request;

process republish criteria in the second message responsive to determining that the second message includes the republish request;

retrieve messages that correspond to the republish criteria from the memory; and output the retrieved messages to the agent.

14. The system of claim 13, wherein the processor is further operative to sort the retrieved messages according to timestamps of the retrieved messages prior to outputting the retrieved messages to the agent.

15. A computer program product comprising a non-transitory computer readable storage medium having program instructions embodied therewith, the program instructions executable by a processor to cause the processor to perform a method comprising:

starting a capture agent on a processor;

subscribing the capture agent to a second agent;

receiving a first message from the second agent, wherein the first message is based at least in part on first data;

storing the received first message in a memory;

receiving a notification of a new subscription from a third agent;

registering the capture agent to subscribe to the new subscription from the third agent;

starting a replay agent to replay a replay message to a user responsive to receiving a replay request;

replaying the replay message based at least in part on second data, wherein the second data differs from the first data; and starting a republish agent to republish a republish message to another agent responsive to receiving a republish request.

16. The computer program product of claim 15, the method further comprising:

receiving a second message at the replay agent;

determining whether the second message includes the replay request;

processing replay criteria in the second message responsive to determining that the second message includes the replay request;

retrieving messages that correspond to the replay criteria from the memory; and outputting the retrieved messages to the user.

17. The computer program product of claim 16, the method further comprising sorting the retrieved messages according to timestamps of the retrieved messages prior to outputting the retrieved messages to the user.

18. The computer program product of claim 16, wherein the replay criteria includes a contextual identifier of the messages.

19. The computer program product of claim 15, wherein the first message includes:

a contextual identifier that identifies a context of the first message;

a message identifier that uniquely identifies the first message;

an agent identifier that identifies an agent that generate the first message; and a timestamp that identifies when the message was generated.

20. The computer program product of claim 15, the method further comprising:

receiving a second message at the republish agent;

determining whether the second message includes the republish request;

processing republish criteria in the second message responsive to determining that the second message includes the republish request;

retrieving messages that correspond to the republish criteria from the memory; and outputting the retrieved messages to the agent.

* * * * *

UNITED STATES PATENT AND TRADEMARK OFFICE
CERTIFICATE OF CORRECTION

PATENT NO. : 9,929,983 B2
APPLICATION NO. : 14/953841
DATED : March 27, 2018
INVENTOR(S) : Jason B. Ellis et al.

Page 1 of 1

It is certified that error appears in the above-identified patent and that said Letters Patent is hereby corrected as shown below:

On the Title Page

(72) Inventors: Column 1, Line 8, should read as follows:
JASON B. ELLIS, New York, NY (US);
ESER KANDOGAN, Mountain View, CA (US);
JEFFREY O. KEPHART, Cortlandt Manor, NY (US);
MARY A. ROTH, San Jose, CA (US)

Signed and Sealed this
Sixteenth Day of April, 2019

Andrei Iancu
*Director of the United States Patent and Trademark Office*